United States Patent
Myers

(10) Patent No.: US 6,864,891 B2
(45) Date of Patent: Mar. 8, 2005

(54) SWITCHING BETWEEN INTERNAL AND EXTERNAL DISPLAY ADAPTERS IN A PORTABLE COMPUTER SYSTEM

(75) Inventor: Robert L. Myers, Loveland, CO (US)

(73) Assignee: Hewlett-Packard Development Company L.P., Houston, TX (US)

(*) Notice: Subject to any disclaimer, the term of this patent is extended or adjusted under 35 U.S.C. 154(b) by 296 days.

(21) Appl. No.: 10/062,803

(22) Filed: Jan. 31, 2002

(65) Prior Publication Data

US 2003/0142089 A1 Jul. 31, 2003

(51) Int. Cl.$^7$ ................................................ G06F 15/16
(52) U.S. Cl. .................. 345/502; 710/303; 345/519; 345/1.1
(58) Field of Search .......................... 345/1.1, 2.1, 3.1, 345/501–503, 519, 520, 1.2; 710/300, 303, 304

(56) References Cited

U.S. PATENT DOCUMENTS

| | | | |
|---|---|---|---|
| 5,682,529 A | 10/1997 | Hendry et al. | |
| 5,926,166 A | 7/1999 | Khederzadeh et al. | |
| 5,935,226 A | * 8/1999 | Klein | 710/303 |
| 5,991,883 A | 11/1999 | Atkinson | |
| 6,038,670 A | 3/2000 | Oh | |
| 6,145,029 A | * 11/2000 | Deschepper et al. | 710/303 |
| 6,304,244 B1 | 10/2001 | Hawkins et al. | |
| 6,438,622 B1 | * 8/2002 | Haghighi et al. | 710/1 |
| 6,654,826 B1 | * 11/2003 | Cho et al. | 710/303 |
| 2002/0073247 A1 | * 6/2002 | Baweja et al. | 710/2 |
| 2003/0067470 A1 | * 4/2003 | Main et al. | 345/520 |
| 2003/0137469 A1 | * 7/2003 | Hansen et al. | 345/3.1 |

* cited by examiner

Primary Examiner—Kee M. Tung

(57) ABSTRACT

Systems and methods of switching between internal and external display adapters in a portable computer system are described. In one aspect, a graphics controller is configured to convert video output signals that are received from a processing unit into locally-generated video control signals and to selectively transmit to a local video display the video control signals that are generated locally or video control signals that are received from a docking station interface. In this way, when undocked, a portable computer unit may drive the local video display with a local adapter that is optimized for mobile usage (e.g., enhanced power management) and, when docked, the portable computer unit may drive the local video display with a higher performance external display adapter, which typically is not constrained by power management considerations.

17 Claims, 3 Drawing Sheets

SWITCHING BETWEEN INTERNAL AND EXTERNAL DISPLAY ADAPTERS IN A PORTABLE COMPUTER SYSTEM

TECHNICAL FIELD

This invention relates to systems and methods of switching between internal and external display adapters in a portable computer system.

BACKGROUND

A portable computer system typically includes a self-contained portable computer unit that includes a processor, memory and a video display, and typically operates under battery power. As used herein, the term "portable computer unit" broadly refers to any computer system that is small enough to be carried easily by a user. The portable computer unit may be called by any number of names, including a laptop computer, a notebook computer, a sub-notebook computer, a hand-held computer, a palmtop computer, a pocket computer, and a notepad computer. The portable computer system also typically includes a docking station to which the portable computer unit may connect in order to access various services and functionality usually only available to desktop computer systems, including access to network adapters and peripheral devices, such as printers, scanners and large external monitors. The portable computer unit typically connects to the docking station through mating socket-type connections.

The portable computer unit typically includes a display adapter. As used herein the term "display adapter" refers broadly to a hardware device that converts images created in a computer to the electronic signals required by a display device. Other terms that have been used to refer to a display adapter include graphics adapter, graphics board, graphics card, graphics controller, video display adapter, video display board, video display card, video display controller, video adapter, video board, video card, video controller, display board, display card, display controller, VGA adapter, VGA board, VGA card and VGA controller. When the portable computer unit is "undocked" (i.e., not connected to the docking station), the video adapter may be used to control the display of graphics on the local video display of the portable computer unit. When the portable computer unit is "docked" (i.e., connected to the docking station), the video adapter may be used to control the display of graphics on an external monitor that is connected to the docking station.

SUMMARY

The invention features a scheme (systems and methods) for switching between internal and external display adapters in a portable computer system. The invention enables a portable computer unit to drive its video display with a local adapter that is optimized for mobile usage (e.g., enhanced power management) when undocked and to drive its video display with a higher performance external display adapter, which typically is not constrained by power management considerations, when docked. In this way, the invention enables the portable computer unit to access higher performance graphics hardware devices that commonly are available only to desktop computer systems.

In one aspect, the invention features a portable computer system that includes a portable computer unit that has a portable computer unit interface, a processor, a video display, and a graphics controller. The portable computer unit interface is configured to connect the portable computer unit to a docking station and to receive video control signals from the docking station. The graphics controller is coupled between the processor, the video display, and the docking station interface. The graphics controller is configured to convert video output signals that are received from the processor into locally-generated video control signals, and to selectively transmit to the video display locally-generated video control signals or video control signals that are received from the portable computer unit interface.

Embodiments in accordance with this aspect of the invention may include one or more of the following features.

The switch preferably is responsive to an active connection status signal indicative of a connection between the portable computer unit and an external source of video control signals. In some embodiments, the graphics controller is configured to generate an active connection status signal based upon one or more signals received from the portable computer unit interface. The graphics controller may be configured to transmit an active connection status signal to the processor. In other embodiments, the processor is programmed to generate an active connection status signal based upon one or more signals received from the portable computer unit interface. The switch may be configured to switch from transmission of locally-generated video control signals to transmission of video control signals that are received from the portable computer unit interface in response to an active connection status signal.

The portable computer unit may include a display controller (or driver) that is coupled between the graphics controller and the video display and is configured to drive the video display based upon video control signals received from the graphics controller.

The portable computer unit also may include one or more external display ports that are configured to connect the portable computer unit to one or more respective external video displays. The graphics controller may be operable to selectively transmit video control signals to one or more of the video display and the one or more external display ports.

The graphics controller preferably is operable to selectively transmit video display identification signals to one of a local display adapter and the portable computer unit interface. The graphics controller may be configured to switch from transmission of video display identification signals to the local display adapter to transmission of video display identification signals to the portable computer unit interface in response to an active connection status signal.

The graphics controller may comprise a multiplexer. In some embodiments, the graphics controller is implemented as a monolithic integrated device.

The portable computer system may include a docking station having an interface that is configured to connect to the portable computer unit through the portable computer unit interface. The docking station preferably comprises a video adapter that is operable to convert into video control signals video output signals that are received from the processor of the portable computer unit.

In another aspect, the invention features a portable computer method in accordance with which video control signals, which are received from one of a local display adapter of the portable computer unit and an external display adapter of a docking station, are selectively transmitted to a video display of a portable computer unit.

Embodiments in accordance with this aspect of the invention may include one or more of the following features.

The portable computer method may include the step of determining whether the portable computer unit is connected to a source of video control signals that is external to the portable computer unit. Video control signals that are received from the local display adapter may be transmitted to the video display in response to a determination that the portable computer unit is unconnected to the external source of video control signals. Video control signals that are received from the external display adapter may be transmitted to the video display in response to a determination that the portable computer unit is connected to the external source of video control signals.

The portable computer method also may include the step of selectively transmitting video control signals to one of the portable computer unit video display and an external video display that is connected to the docking station.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Figure 1:
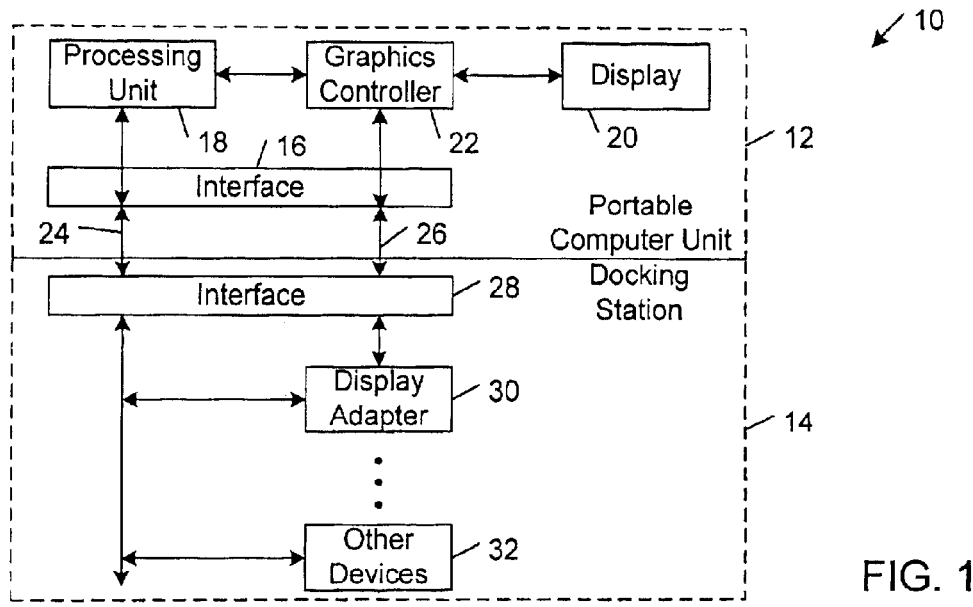
FIG. 1 is a block diagram of a portable computer system, including a portable computer unit and a docking station.

Referring to FIG. 1, in one embodiment, a portable computer system 10 includes a portable computer unit 12 and a docking station 14.

Portable computer unit 12 may be implemented in the form of any one of a wide variety of conventional computer systems that are small enough to be carried by a user, including a laptop computer, a notebook computer, a sub-notebook computer, a hand-held computer, a palmtop computer, a pocket computer, and a notepad computer. In general, portable computer unit 12 includes an interface 16, a processing unit 18, a video display 20, and a graphics controller 22. Interface 16 is configured to connect portable computer unit 12 to docking station 14 and to exchange with docking station 14 conventional docking station signals 24 as well as video control signals 26 for driving video display 20. Processing unit 18 may include one or more processors, each of which may be in is the form of any one of various commercially available processors. Video display 20 may be a conventional flat panel display, such as a LCD (liquid crystal display), a plasma display, an EL display (electro-luminescent display) and a FED (field emission display). Portable computer unit 12 also may include other components (not shown), such as a system memory and a system bus. The system memory typically includes a read only memory (ROM) that stores a basic input/output system (BIOS) that contains start-up routines for portable computer unit 12, and a random access memory (RAM). The system bus may be a memory bus, a peripheral bus or a local bus, and may be compatible with any of a variety of bus protocols, including PCI, VESA, Microchannel, ISA, and EISA. Portable computer unit 12 also may include a hard drive, a floppy drive, and CD ROM drive that are connected to the system bus by respective interfaces. The hard drive, floppy drive, and CD ROM drive contain respective computer-readable media disks that provide non-volatile or persistent storage for data, data structures and computer-executable instructions. Other computer-readable storage devices (e.g., magnetic tape drives, flash memory devices, and digital video disks) also may be used with portable computer unit 12. A user may interact (e.g., enter commands or data) with portable computer unit 12 using a keyboard and a mouse. Other input devices (e.g., a microphone, joystick, or touch pad) also may be provided.

As explained in detail below, graphics controller 22 is configured to convert video output signals received from processing unit 18 into locally-generated video control signals and to selectively transmit to the video display the video control signals that are generated locally or video control signals that are received from interface 16. In this way, when undocked, portable computer unit 12 may drive video display 20 with a local adapter that is optimized for mobile usage (e.g., enhanced power management) and, when docked, portable computer unit 12 may drive video display 20 with a higher performance external display adapter, which typically is not constrained by power management considerations.

Docking station 14 may be implemented in a form that is designed to complement and enhance the functionality of portable computer unit 12. In general, docking station 12 includes an interface 28, a display adapter 30, and one or more other devices 32, which may be in the form of any of a wide variety of different conventional docking station devices, including storage disk drives, network adapters, and other peripheral adapters. Interface 28 is configured to connect to portable computer unit 12 through portable unit interface 16. The interface connection may be ISA-based or PCI-based, or both. Interface 28 is configured to exchange with portable computer unit interface 16 conventional docking station signals 24 as well as video control signals 26 for driving video display 20. Display adapter 30 and the other docking station devices 32 communicate with interface 28 over a system bus 33. In some embodiments, docking station 12 may have an internal power supply (not shown) that is configured to power all of the component devices of docking station 12. In other embodiments, docking station 12 may not have an internal power supply, in which case portable computer unit 12 would be configured provide power to docking station 12 through a switch.

Figure 2:
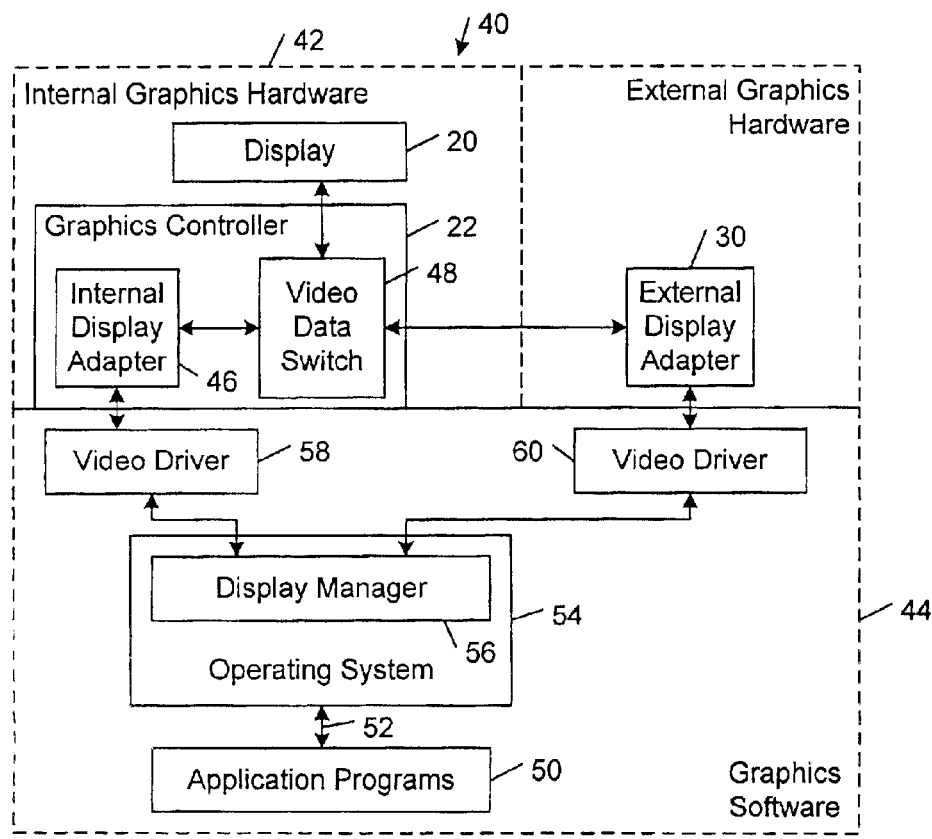
FIG. 2 is a block diagram of certain graphics hardware and graphics software components of the portable computer system of FIG. 1.

Referring to FIG. 2, in one embodiment, portable computer unit 12 includes a display control architecture 40 that includes a graphics hardware component 42 and a graphics software component 44. Graphics controller 22 includes an internal (or local) display adapter 46 that is configured to convert video output signals that are received from processing unit 18 into video control signals. Graphics controller 22 also includes a video data switch 48 that is configured to selectively transmit to video display 20 video control signals that are generated locally by local display adapter 46 or external video control signals that are received from external display adapter 30 through interface 16. In operation, one or more software application programs 50 may generate data 52 (e.g., text, windows and other graphical objects, and command structures, such as menus and dialog boxes) that is to be displayed on video display 20. An operating system 54 converts the application program data 52 into video output signals. Operating system 54 includes a display manager 56 that communicates with graphics controller 22 through a video driver 58. When docked, display manager 56 communicates with external display adapter 30 through a video driver 60. Display manager 56 also communicates with other parts of operating system 54 and with application programs 50 to coordinate these components with the current display environment.

Figure 3:
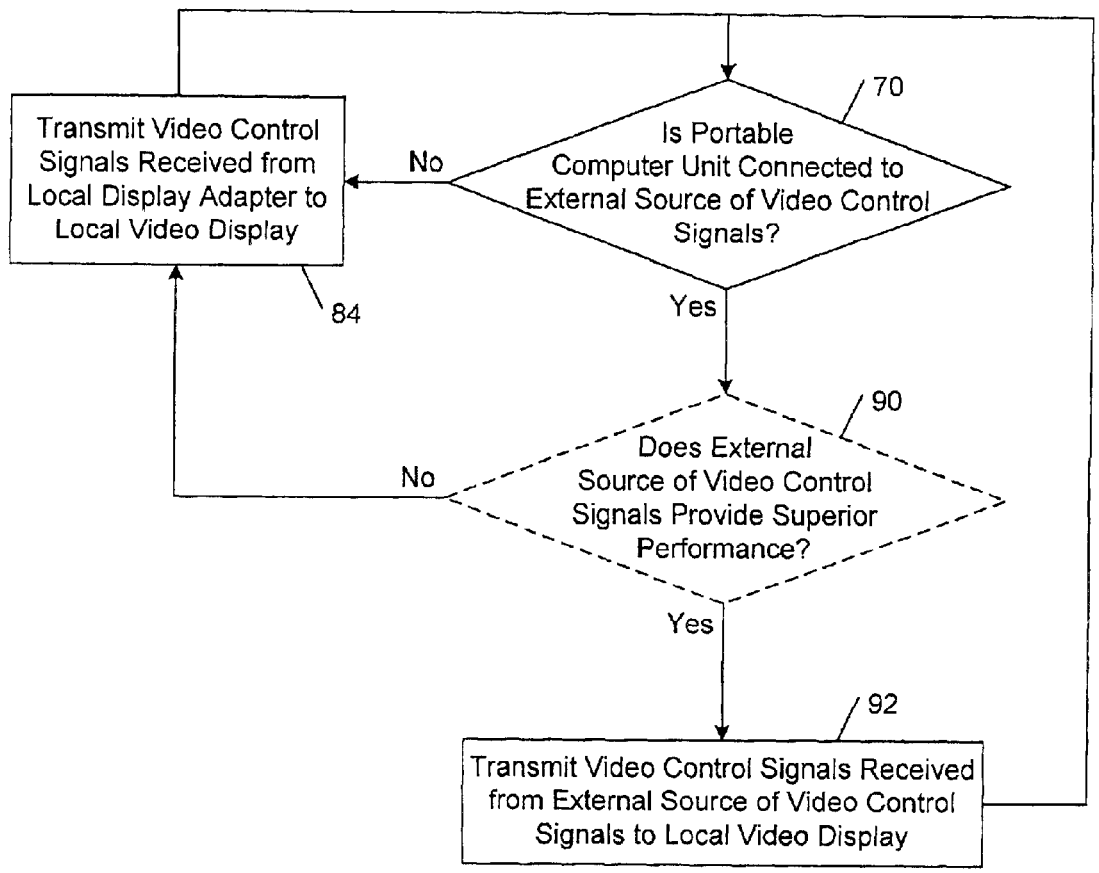
FIG. 3 is a flow diagram of a method of switching between internal and external display adapters in a portable computer system.

Referring to FIG. 3, in one embodiment, graphics controller 22 is configured to automatically switch the source of video control signals from the internal, local display adapter 46 to the external display adapter 30 that is located on docking station 14, as follows.

Figure 4:
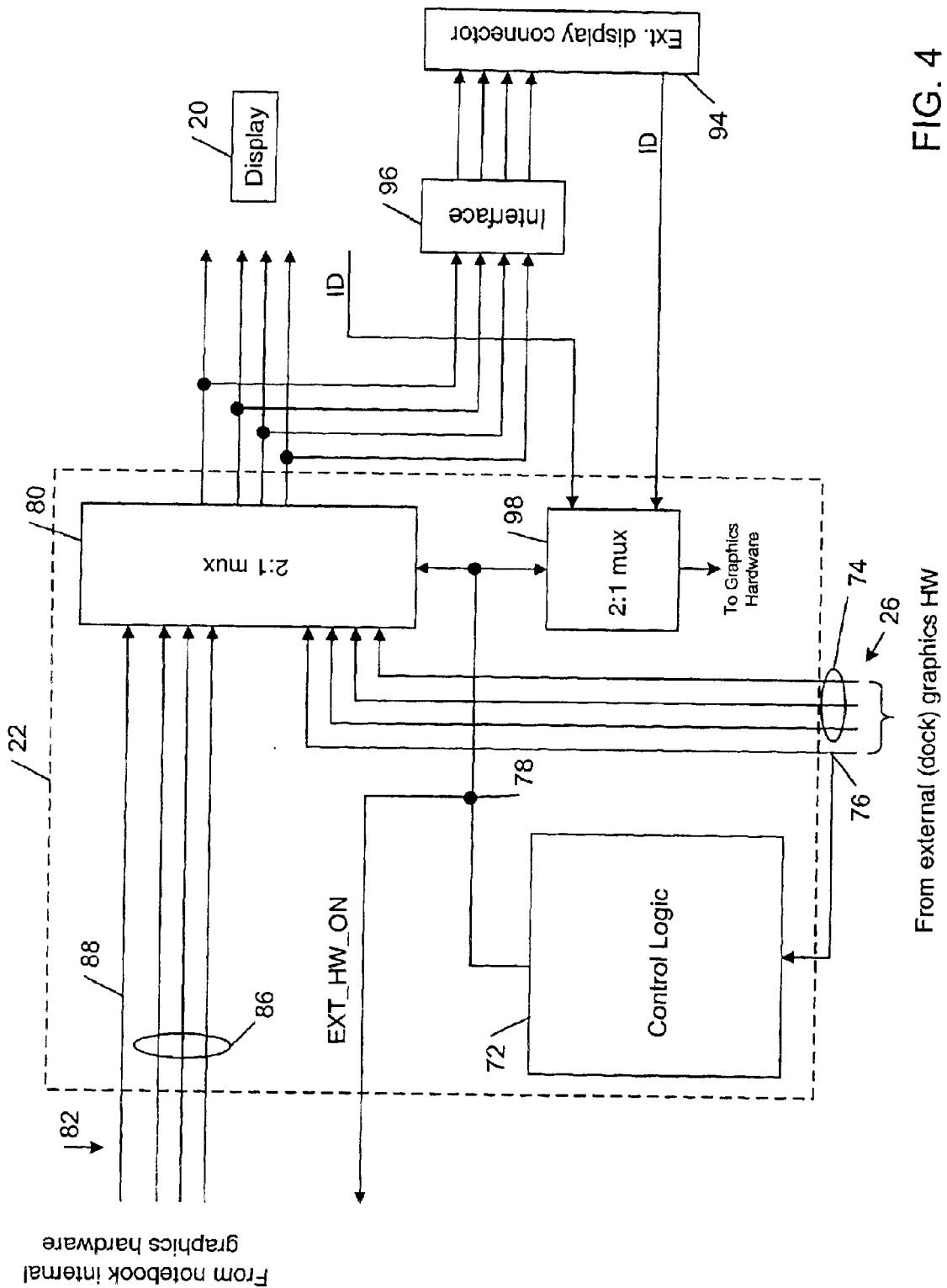
FIG. 4 is a block diagram of signals flowing through certain components of the portable computer unit illustrated in FIG. 1.

Graphics controller 22 determines whether portable computer unit 12 is connected to an external source of video control signals (step 70). As shown in FIG. 4, graphics controller 22 may include control logic 72 that is coupled to receive one or more video control signals 26 from interface 16. Video control signals 26 may include standard RGB video data signals 74 and one or more other video control signals 76 (e.g., external display clock signals and synchronization signals, such as line and frame synchronization signals and horizontal and vertical synchronization signals). Based upon video control signals 76, control logic 72 is configured to generate a connection status signal 78 (EXT_HW_ON) that indicates whether portable computer unit 12 is connected to an external source of video control signals. For example, in one embodiment, control logic 72 may set the connection status signal 78 to "active" if one of the following conditions is satisfied: an external horizontal synchronization signal with a frequency greater than 10 kHz is detected; an external vertical synchronization signal with a frequency greater than 10 kHz is detected; or an external pixel clock signal with a frequency greater than 1 MHz is detected. The connection status signal 78 is transmitted to processing unit 18 so that the system can accommodate the video source that is currently driving video display 20. If control logic 72 does not detect a connection to an external source of video control signals (step 70), the connection status signal 78 is set to "inactive," which sets a switch 80 (e.g., a 2:1 multiplexer) to transmit to video display 20 video control signals 82 that are generated by internal display adapter 46 (step 84). Video control signals 82 may include standard RGB video data signals 86 and other video control signals 88 (e.g., synchronization signals, clock display signals, and display enable signals). In some embodiments, if control logic 72 detects a connection to an external source of video control signals (step 70), control logic 72 may determine whether the external source of video control signals performs better than internal display adapter 46 (step 90). In these embodiments, if the external source of video control signals provides superior performance (step 90), control logic 72 sets the connection status signal 78 to "active," which sets switch 80 to transmit to video display 20 video control signals 82 that are received from the external source of video control signals (step 92). If the external source of video control signals does not provide superior performance (step 90), the connection status signal 78 is set to "inactive," which sets a switch 80 (e.g., a 2:1 multiplexer) to transmit to video display 20 video control signals 82 that are generated by internal display adapter 46 (step 84). In other embodiments, control logic 72 does not determine whether the external source of video control signals provides superior performance and, instead, simply sets the connection status signal 78 to "active" whenever a connection to an external source of video control signals is detected (step 92).

As shown in FIG. 4, in some embodiments, graphics controller 22 may include an external display connector (or port) 94 that is configured to connect portable computer unit 12 to an external video display. In these embodiments, portable computer unit 12 may include an interface 96 (e.g., a TMDS transmitter, a LVDS transmitter, or a digital-to-analog converter) that is configured to perform digital-to-analog conversion or digital output functions as may be provided to drive an external video display. Because the video control signal switching function is implemented by switch 80 in the digital data path prior to the internal display panel connection and prior to the external display interface 96, an external display may be selectively driven by either the internal display adapter 46 or the external display adapter 30 (when portable computer unit is docked).

In some embodiments, graphics controller 22 also may include a switch 98 (e.g., a 2:1 multiplexer) that is configured to route to the graphics hardware that currently is in use any video display identification signals that may be received from display 20 or the external display connector 94. In this way, the system will always have access to the display identification information via the current graphics subsystem.

Other embodiments are within the scope of the claims.

Although systems and methods have been described herein in the context of a particular computing environment, these systems and methods are not limited to any particular hardware or software configuration, but rather they may be implemented in any portable computing or processing environment, including in digital electronic circuitry or in computer hardware, firmware or software.

In addition, in the embodiments described above, graphics controller 22 has been shown as a separate component that may be located on a separate monolithic card or printed circuit board. In other embodiments, however, graphics controller 22 may be incorporated with other components on a single card, such as a motherboard for portable computer unit 12.

In some embodiments, the video control signal switching function may be performed under direct control of processing unit 18, rather than through the use of switch 80 of graphics controller 22. In addition, in some embodiments, processing unit 18 may perform the switching control function, with an automatic override based upon connectivity status such that the internal display connection would always be made in the event of an unexpected disconnection or failure of the external graphics hardware.

Still other embodiments are within the scope of the claims.

What is claimed is:

1. A portable computer system, comprising a portable computer unit having:
   a portable computer unit interface configured to connect the portable computer unit to a docking station and to receive video control signals from the docking station;
   a processor;
   a video display; and
   a graphics controller coupled between the processor, the video display, and the docking station interface and configured to
      convert video output signals received from the processor into locally-generated video control signals, automatically determine performance the video control signals received from the portable computer interface provide relative to the locally-generated video control signals, and selectively transmit to the video display either the locally-generated video control signals or the video control signals received from the portable computer unit interface based on the automatic relative performance determination.

2. The portable computer system of claim 1, wherein the graphics controller is responsive to an active connection status signal indicative of a connection between the portable computer unit and an external source of video control signals.

3. The portable computer system of claim 2, wherein the graphics controller is configured to generate an active connection status signal based upon one or more signals received from the portable computer unit interface.

4. The portable computer system of claim 3, wherein the graphics controller is configured to transmit an active connection status signal to the processor.

5. The portable computer system of claim 2, wherein the processor is programmed to generate an active connection status signal based upon one or more signals received from the portable computer unit interface.

6. The portable computer system of claim 2, wherein the graphics controller is configured to switch from transmission of locally-generated video control signals to transmission of video control signals received from the portable computer unit interface in response to an active connection status signal.

7. The portable computer system of claim 1, wherein the portable computer unit further comprises a display controller coupled between the graphics controller and the video display and configured to drive the video display based upon video control signals received from the graphics controller.

8. The portable computer system of claim 1, wherein the portable computer unit further comprises one or more external display ports configured to connect the portable computer unit to one or more respective external video displays.

9. The portable computer system of claim 8, wherein the graphics controller is operable to selectively transmit video control signals to one or more of the video display and the one or more external display ports.

10. The portable computer system of claim 1, wherein the graphics controller is operable to selectively transmit video display identification signals to one of a local display adapter and the portable computer unit interface.

11. The portable computer system of claim 10, wherein the graphics controller is configured to switch from transmission of video display identification signals to the local display adapter to transmission of video display identification signals to the portable computer unit interface in response to an active connection status signal.

12. The portable computer system of claim 1, wherein the graphics controller comprises a multiplexer.

13. The portable computer system of claim 1, wherein the graphics controller is implemented as a monolithic integrated device.

14. The portable computer system of claim 1, further comprising a docking station having an interface configured to connect to the portable computer unit through the portable computer unit interface.

15. The portable computer system of claim 14, wherein the docking station comprises a display adapter operable to convert into video control signals video output signals received from the processor of the portable computer unit.

16. The portable computer system of claim 1, wherein the graphics controller selectively transmits the video control signals received from the portable computer unit interface to the video display in response to a determination that the video control signals received from the portable computer unit interface provide higher performance than the locally-generated video control signals.

17. The portable computer system of claim 1, wherein the graphics controller selectively transmits the locally-generated video control signals to the video display in response to a determination that the video control signals received from the portable computer unit interface fail to provide higher performance than the locally-generated video control signals.

* * * * *